(12) United States Patent
Fiumi

(10) Patent No.: US 9,026,446 B2
(45) Date of Patent: May 5, 2015

(54) SYSTEM FOR GENERATING CAPTIONS FOR LIVE VIDEO BROADCASTS

(76) Inventor: Morgan Fiumi, Santa Monica, CA (US)

( * ) Notice: Subject to any disclaimer, the term of this patent is extended or adjusted under 35 U.S.C. 154(b) by 488 days.

(21) Appl. No.: 13/158,331

(22) Filed: Jun. 10, 2011

(65) Prior Publication Data

US 2012/0316882 A1 Dec. 13, 2012

(51) Int. Cl.
- *G10L 11/00* (2006.01)
- *G10L 15/30* (2013.01)
- *G10L 15/32* (2013.01)
- *G10L 15/26* (2006.01)

(52) U.S. Cl.
CPC ............... *G10L 15/30* (2013.01); *G10L 15/26* (2013.01); *G10L 15/32* (2013.01)

(58) Field of Classification Search
USPC ........................................................ 704/240
See application file for complete search history.

(56) References Cited

U.S. PATENT DOCUMENTS

| | | | |
|---|---|---|---|
| 5,027,406 A * | 6/1991 | Roberts et al. ............... 704/244 |
| 6,325,632 B1 | 12/2001 | Chao |
| 6,502,233 B1 | 12/2002 | Vaidyanathan et al. |
| 6,832,189 B1 * | 12/2004 | Kanevsky et al. ........... 704/235 |
| 6,954,894 B1 | 10/2005 | Balnaves et al. |
| 6,976,031 B1 * | 12/2005 | Toupal et al. .......................... 1/1 |
| 7,050,550 B2 * | 5/2006 | Steinbiss et al. .......... 379/88.01 |
| 7,346,507 B1 * | 3/2008 | Natarajan et al. ........... 704/244 |
| 7,665,020 B2 | 2/2010 | Simonyi |
| 7,848,926 B2 * | 12/2010 | Goto et al. ................... 704/251 |
| 7,937,688 B2 | 5/2011 | Vaidyanathan et al. |
| 7,941,317 B1 * | 5/2011 | Goffin et al. .............. 704/256.7 |
| 8,014,591 B2 * | 9/2011 | Baker ............................ 382/159 |
| 8,073,681 B2 * | 12/2011 | Baldwin et al. ................... 704/9 |
| 8,117,542 B2 | 2/2012 | Radtke et al. |
| 8,161,386 B1 | 4/2012 | Mark |
| 8,185,866 B2 | 5/2012 | Hawley et al. |
| 2001/0051913 A1 * | 12/2001 | Vashistha et al. ............... 705/37 |
| 2002/0049589 A1 * | 4/2002 | Poirier ......................... 704/235 |
| 2002/0049778 A1 | 4/2002 | Bell et al. |
| 2002/0095582 A1 | 7/2002 | Peled et al. |
| 2002/0116716 A1 | 8/2002 | Sideman |
| 2002/0152071 A1 * | 10/2002 | Chaiken et al. ............... 704/251 |
| 2002/0156632 A1 * | 10/2002 | Haynes et al. ................ 704/270 |
| 2002/0167939 A1 * | 11/2002 | Weissman-Berman et al. ........................... 370/352 |

(Continued)

FOREIGN PATENT DOCUMENTS

IT WO2009/132871 A1 * 5/2009 .............. G10L 15/26

OTHER PUBLICATIONS

Marks et al (hereafter Marks) "A distributed live subtitling system" BBC R&D White Paper Sep. 2003, all pages.*

(Continued)

*Primary Examiner* — Paras D Shah
*Assistant Examiner* — Fariba Sirjani
(74) *Attorney, Agent, or Firm* — Knobbe Martens Olson & Bear LLP

(57) ABSTRACT

An adaptive workflow system can be used to implement captioning projects, such as projects for creating captions or subtitles for live and non-live broadcasts. Workers can repeat words spoken during a broadcast program or other program into a voice recognition system, which outputs text that may be used as captions or subtitles. The process of workers repeating these words to create such text can be referred to as respeaking. Respeaking can be used as an effective alternative to more expensive and hard-to-find stenographers for generating captions and subtitles.

18 Claims, 10 Drawing Sheets

(56) References Cited

U.S. PATENT DOCUMENTS

| | | | |
|---|---|---|---|
| 2003/0012347 A1* | 1/2003 | Steinbiss et al. | 379/88.01 |
| 2003/0212589 A1* | 11/2003 | Kish | 705/9 |
| 2004/0048233 A1 | 3/2004 | Matthews | |
| 2004/0064317 A1* | 4/2004 | Othmer et al. | 704/260 |
| 2004/0191744 A1 | 9/2004 | Guirguis | |
| 2005/0183109 A1* | 8/2005 | Basson et al. | 725/4 |
| 2005/0216331 A1* | 9/2005 | Ahrens et al. | 705/11 |
| 2005/0240916 A1 | 10/2005 | Sandrew | |
| 2005/0273381 A1* | 12/2005 | Thomas | 705/11 |
| 2006/0228689 A1 | 10/2006 | Rajaram | |
| 2007/0020604 A1 | 1/2007 | Chulet | |
| 2007/0043525 A1* | 2/2007 | Brown et al. | 702/81 |
| 2007/0111184 A1 | 5/2007 | Sperle | |
| 2007/0143103 A1* | 6/2007 | Asthana et al. | 704/200 |
| 2007/0208570 A1* | 9/2007 | Bhardwaj et al. | 704/270.1 |
| 2007/0288663 A1* | 12/2007 | Shear | 709/249 |
| 2008/0040111 A1* | 2/2008 | Miyamoto et al. | 704/240 |
| 2008/0091694 A1* | 4/2008 | Harter et al. | 707/100 |
| 2008/0222734 A1* | 9/2008 | Redlich et al. | 726/26 |
| 2008/0243499 A1* | 10/2008 | Poi | 704/231 |
| 2009/0009661 A1* | 1/2009 | Murakami et al. | 348/468 |
| 2009/0052636 A1* | 2/2009 | Webb et al. | 379/88.14 |
| 2009/0204471 A1* | 8/2009 | Elenbaas et al. | 705/9 |
| 2009/0207020 A1* | 8/2009 | Garnier et al. | 340/541 |
| 2009/0240736 A1 | 9/2009 | Crist | |
| 2009/0292539 A1* | 11/2009 | Jaroker | 704/235 |
| 2009/0319265 A1* | 12/2009 | Wittenstein et al. | 704/234 |
| 2010/0063815 A1* | 3/2010 | Cloran et al. | 704/235 |
| 2010/0080528 A1 | 4/2010 | Yen et al. | |
| 2010/0178956 A1* | 7/2010 | Safadi | 455/563 |
| 2010/0223615 A1* | 9/2010 | Cross | 718/1 |
| 2010/0250241 A1* | 9/2010 | Iwahashi et al. | 704/10 |
| 2010/0279681 A1* | 11/2010 | Ahmad et al. | 455/424 |
| 2011/0010306 A1* | 1/2011 | Gonzalez et al. | 705/326 |
| 2011/0066469 A1* | 3/2011 | Kadosh | 705/9 |
| 2011/0087491 A1* | 4/2011 | Wittenstein et al. | 704/235 |
| 2011/0161077 A1* | 6/2011 | Bielby | 704/231 |
| 2011/0282795 A1* | 11/2011 | Kadosh | 705/80 |
| 2012/0029978 A1* | 2/2012 | Olding et al. | 705/7.42 |
| 2012/0162363 A1 | 6/2012 | Huang et al. | |
| 2012/0314025 A1* | 12/2012 | Fiumi | 348/43 |
| 2013/0317818 A1* | 11/2013 | Bigham et al. | 704/235 |

OTHER PUBLICATIONS

Evaluation of a Live Broadcast News Subtitling System for Portuguese, Hugo Meinedo, Márcio Viveiros, João Paulo Neto Jan. 2008; In proceeding of: Interspeech 2008, 9th Annual Conference of the International Speech Communication Association, Brisbane, Australia, Sep. 22-26, 2008.*

Pond, "Hollywood Outsources DVD Captions to . . . India?", published Apr. 27, 2010 on http://www.therwrap.com/movies/print/16727.

Nikse.dk, Subtitle Edit 3.2 Help, http://www.nikse.dk/SubtitleEdit/help, printed on Nov. 26, 2011, in 14 pages.

* cited by examiner

SYSTEM FOR GENERATING CAPTIONS FOR LIVE VIDEO BROADCASTS

BACKGROUND

It is common in the technology sector, as well as in other areas of the business community, for companies to attempt to increase profits by directly or indirectly outsourcing certain projects to areas of the world that have an abundant supply of cost-effective labor. However, despite having the benefits of more cost-effective labor, many outsourcing projects fail to deliver the promised cost savings and produce an inferior result.

One of the main problems encountered in outsourcing has more to do with the management of the labor than the skills of the remote workers. Many projects are managed with little oversight or feedback, resulting in subpar work that must be revised or, in some cases, redone. Another problem facing companies is a difficulty in selecting qualified remote workers for a given task.

SUMMARY

In certain embodiments, a method of performing distributed caption generation includes selecting first and second respeakers to perform respeaking with a voice recognition engine for a broadcast program based at least in part on past performance ratings of the first and second respeakers; receiving first text generated by the first respeaker for inclusion in the broadcast program; receiving second text generated by the second respeaker for inclusion in the broadcast program, wherein the second text is being received as backup in case receipt of the first text is interrupted; outputting the first text for inclusion as captions in the broadcast program; determining whether receipt of the first text is interrupted; in response to determining that receipt of the first text is interrupted, outputting the second text for inclusion in the broadcast program; and calculating new performance ratings for the first and second respeakers, the new performance ratings configured to be used to assign the first or second respeaker to a subsequent broadcast program; where at least said determining is implemented by a computer system having computer hardware.

In certain embodiments, a method of performing distributed caption generation includes receiving first text generated by a first respeaker with a voice recognition engine for inclusion in an audio program; receiving second text generated by a second respeaker with the voice recognition engine for inclusion in the audio program, the second text being received as backup in case the first text is no longer received; outputting the first text for inclusion in the audio program; determining whether an interruption has occurred related to receipt of the first text; and in response to determining that the interruption has occurred, outputting the second text of the second respeaker for inclusion in the audio program; where at least said determining is implemented by a computer system having computer hardware.

In certain embodiments, a system for performing distributed caption generation includes a project network application having a respeaking module that can: provide functionality for first and second respeakers to generate text responsive to audio of a broadcast, receive first text generated by the first respeaker, and receive second text generated by the second respeaker as backup in case the first text is no longer received; and a failover module having computer hardware, which can: output the first text for inclusion in the broadcast, determining whether an interruption has occurred related to receipt of the first text, and in response to determining that the interruption has occurred related to receipt of the first text, output the second text of the second respeaker for inclusion in the broadcast.

In various embodiments, a non-transitory physical computer storage having instructions stored thereon for implementing, in one or more processors, operations for performing distributed caption generation can include receiving first text generated by a first respeaker with a voice recognition engine for inclusion in an audio program; receiving second text generated by a second respeaker with the voice recognition engine for inclusion in the audio program, the second text being received as backup in case the first text is no longer received; outputting the first text for inclusion in the audio program; determining whether the first text is no longer being received; and in response to determining that the first text is no longer being received, outputting the second text of the second respeaker for inclusion in the audio program.

Additionally, a method of performing distributed caption generation includes, in certain embodiments, selecting a respeaker to perform respeaking with a voice recognition engine for a broadcast program based at least in part on a past performance rating of the respeaker; receiving text generated by the respeaker for inclusion in the broadcast program; outputting the text for inclusion in the broadcast program; calculating a new performance rating for the respeaker, the new performance rating configured to be used to evaluate whether to assign the respeaker to a subsequent broadcast program; where at least said calculating is implemented by a computer system having computer hardware.

In certain embodiments, a system for performing distributed caption generation can include a project management module that can select a respeaker to perform respeaking with a voice recognition engine for a broadcast based at least in part on a past performance rating of the respeaker; a project network application having a respeaking module configured to: provide functionality for the respeaker to generate text responsive to audio from a broadcast, receive text generated by the respeaker, and output the text for inclusion in the broadcast; and a worker ratings calculator having computer hardware, the worker ratings calculator configured to calculate a new performance rating for the respeaker, the new performance rating configured to be used to evaluate whether to assign the respeaker to a subsequent broadcast program.

Further, in certain embodiments, non-transitory physical computer storage having instructions stored thereon for implementing, in one or more processors, operations for performing distributed caption generation includes selecting a respeaker to perform respeaking with a voice recognition engine for a program based at least in part on a past performance rating of the respeaker; receiving text generated by the respeaker for inclusion in the program; outputting the text for inclusion in the program; and calculating a new performance rating for the respeaker, the new performance rating configured to be used to evaluate whether to assign the respeaker to a subsequent program.

In certain embodiments, non-transitory physical computer storage having instructions stored thereon for implementing, in one or more processors, operations for performing distributed caption generation includes receiving speech audio from a respeaker user with a voice recognition engine, the voice recognition engine comprising a plurality of voice recognition systems, the speech audio corresponding to speech output by the respeaker user in order to transcribe broadcast audio; providing the speech audio to the plurality of voice recognition systems; receiving text output from each of the voice recognition systems; receiving a calculated probability of accuracy for the output text from each of the voice recognition systems; and selecting the output text from one of the voice recognition systems based on the calculated probability of accuracy.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
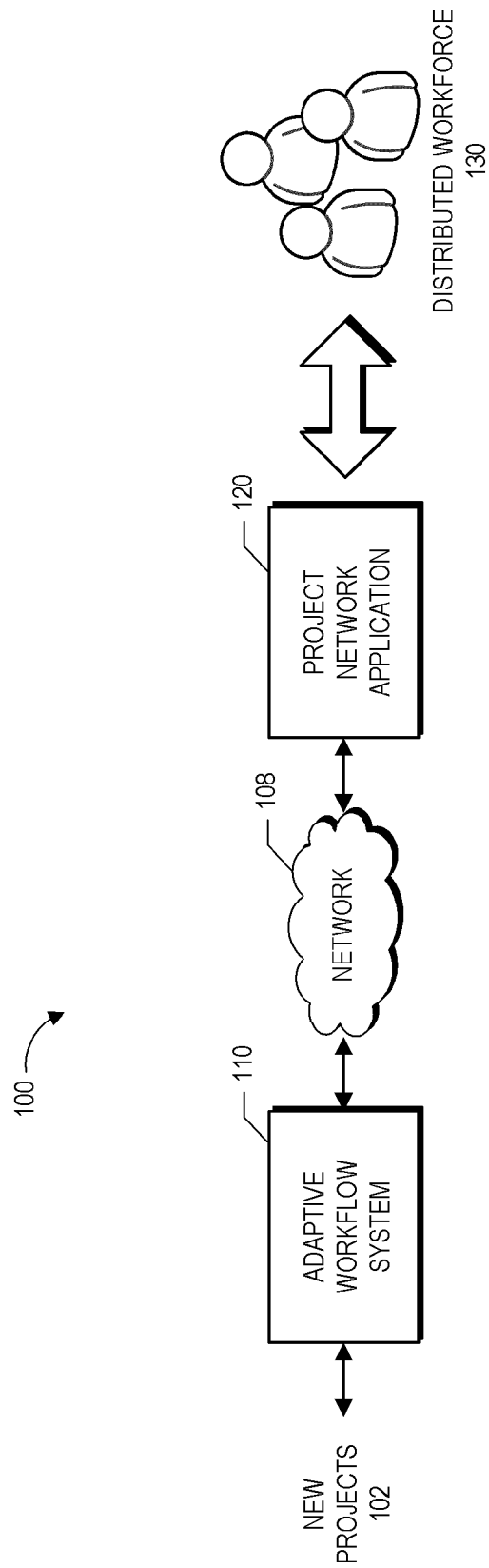
FIG. 1 illustrates an example embodiment of a computing environment for adaptively outsourcing captioning projects to a distributed workforce.

This disclosure describes example embodiments of an adaptive workflow system. Certain embodiments distribute work objects or pieces and dynamically evaluate the performance of workers, including outsourcing workers. The adaptive workflow system can provide higher priority or more desirable projects and/or larger quantity of projects to workers that have relatively higher rated performance and have time availability. Further, the adaptive workflow system can provide other benefits to workers with higher rated performance, such as higher pay, more time off, and so forth. As a result, the adaptive workflow system can motivate improved performance among workers and can identify higher performing workers, thereby reducing costs and increasing quality of outsourced projects.

In certain embodiments, the adaptive workflow system can be used to implement captioning projects, such as projects for creating captions for live broadcasts or subtitles for non-live videos. Workers can repeat words spoken during a broadcast program or other program into a voice recognition system, which outputs text that may be used as captions or subtitles. The process of workers repeating these words to create such text can be referred to as respeaking, voice writing, or shadow speaking, among other appellations. Respeaking can be used to replace more expensive and hard-to-find stenographers for generating captions and subtitles. The features of the adaptive workflow system can also be implemented for other types of projects, including projects unrelated to captioning. As used herein, the term "caption" and its derivatives, in addition to having their ordinary meaning, can refer to both captions for live broadcasts and captions or subtitles for non-live broadcasts (such as movies released on DVD or other storage media).

For ease of illustration, the remainder of this specification will refer primarily to broadcast programs. However, it should be understood that the features described herein may also be applied to non-broadcasted programs or the like. For example, the respeaking and other features described herein may be used in the context of any television, movie, or other video program, including programs presented over the Internet or web. For example, these features may be used for presentations at conferences (e.g., at a tradeshow or convention), lectures, webcasts, or anywhere where someone is speaking, including radio broadcasts or teletype (TTY) calls (where a display presents the text of the radio broadcast or teletype conversation). Respeaking may generally be used for persons who are hard of hearing or who are in loud environments (such as a tradeshow), where hearing ability is reduced by the environment. Further, respeaking may be used to generate text that may be uploaded to a server, such as a web server, in searchable format for users to access. More generally, the respeaking and other features described herein can be implemented for any audio program, which in addition to having its ordinary meaning, can include video programs that include audio.

Moreover, respeaking can also be used to provide text translations, where the respeaker listens to an audio program in one language and respeaks in another language, thereby creating textual captions in the other language.

Although this disclosure is described primarily in the context of outsourcing projects to remote workers, such as workers in a foreign country, the features described herein can also be applied to provide projects to workers within a country native to a company's business and/or to distribute work tasks within a company, on a non-outsourced basis, to employees of the company. Further, the features described herein can also be applied to provide projects to workers who are both native to the company's business and workers from other countries. More generally, the term "outsourcing" and its derivatives, in addition to having their ordinary meaning, can refer to providing a project to any workers who are not employees of the company that provides the project, including independent contractors, consultants, and the like.

II. Example Adaptive Workflow Systems

FIG. 1 illustrates an embodiment of a computing environment 100 for adaptively outsourcing or otherwise providing new projects 102 to a distributed workforce 130. In the computing environment, new projects 102 are provided to an adaptive workflow system 110 by a customer of the provider of the adaptive workflow system 110. It is understood that in certain embodiments, the provider of the adaptive workflow system 110 may be the same entity as the entity providing new projects for the distributed workforce.

The projects 102 may be captioning or respeaking projects, where a worker repeats words of a live broadcast program or non-live program into a voice recognition system to thereby create textual captions or subtitles for the program. Instructions for performing the respeaking projects 102 can be received over a network from a customer computer system (e.g., a broadcaster or program provider). The network may be a local area network (LAN), a wide area network (WAN), such as the Internet, combinations of the same, or the like. For example, the network 108 can include an organization's private intranet, the public Internet, or a combination of the same.

In certain embodiments, the adaptive workflow system 110 adaptively assigns the new projects 102 to members of a distributed workforce 130 based on one or more of the following criteria:

past performance;
time availability;
skill set (e.g., experience with certain types and/or brands of voice recognition software);
willingness to help other workers in the distributed workforce (e.g., willingness to review the work of other workers, willingness to provide suggestions to other workers on how to perform one or more tasks);
geographical location (e.g., physical location, location within a specified country);
worker time zone;
customer specifications (e.g., where the customer may specify that workers from certain countries or regions are not to be used for security or contractual reasons);
improper copying or disclosure of a work piece; or
other criteria.

The workers 130 access the projects 102 with a project network application 120 using, for example, personal computer systems or the like. Advantageously, in certain embodiments, because the adaptive workflow system 110 assigns projects based at least in part on past worker 130 performance, project quality may be enhanced and project completion costs may be reduced.

The adaptive workflow system 110 can make projects 102 available to the project network application 120 over a network 108, which may be a local area network (LAN), a wide area network (WAN), the Internet, combinations of the same, or the like. For example, the network 108 can include an organization's private intranet, the public Internet, or a combination of the same.

The project network application 120 can be a web application hosted by the adaptive workflow system, another system (e.g., a third party computing and storage cloud operator), or the like. The project network application 120 can be hosted on the workers' personal computing device, or other hosted application that workers 130 can access with a browser or other client software or interface. The project network application 120 can include tools for respeaking, including voice recognition software such as the Dragon Naturally Speaking™ voice recognition engine available from Nuance™. The voice recognition software may be modified to perform voice recognition over the network 108. Alternatively, the voice recognition software may be downloaded from the project network application 120 to the computer systems of the workers 130.

The adaptive workflow system can calculate performance ratings for the workers 130 based on their performance on the projects 102. When a worker is a new worker without a record of past performance on projects, the performance rating may be based on testing performed when the worker registered with the adaptive workflow system (e.g., where the user is given a sample project, such as a simple respeaking exercise) and the worker's associated test performance. In addition or instead, a new worker's performance rating may be based in whole or in part on the worker's claimed skills or familiarly with one or more types of software applications (e.g., voice recognition applications), such as may be provided during a worker registration process.

Advantageously, in certain embodiments, the adaptive workflow system 110 can provide higher priority or more desirable projects 102 and/or relatively larger amounts of work to workers 130 that have higher rated performance. Further, the adaptive workflow system 110 can provide other benefits to workers 130 with higher rated performance, such as higher pay per unit of work (e.g., per frame or other work piece processed, per hour worked, etc.), more time off, and so forth. As a result, the adaptive workflow system 110 can motivate improved performance among workers and can identify higher performing workers to send work to, thereby reducing costs and increasing quality of the projects 102.

Additionally, the adaptive workforce system 110 can provide functionality for respeaking to continue unimpeded should a worker's system fail. These and other features of the adaptive workflow system 110 are described in greater detail below.

Figure 2:
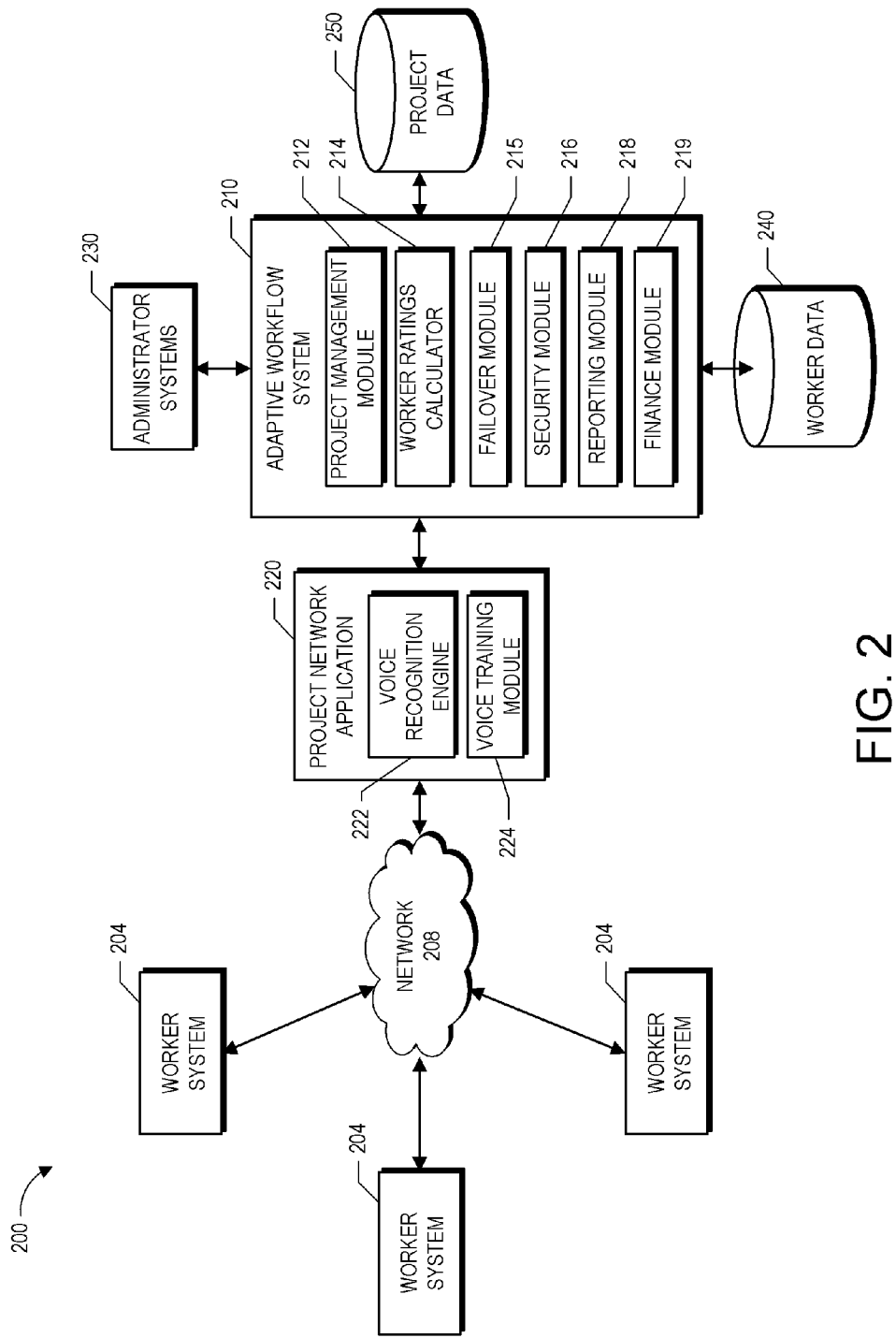
FIG. 2 illustrates a more detailed example embodiment of a computing environment for adaptively outsourcing captioning projects to a distributed workforce.

FIG. 2 illustrates a more detailed embodiment of a computing environment 200 for adaptively outsourcing projects to a distributed workforce. The computing environment 200 includes the components of FIG. 1, such as an adaptive workflow system 210, a project network application 220, and a network 208. These components can have the same functionality as described above, as well as further functionality as described below. Worker systems 204, operated by workers of the distributed workforce 130 (sometimes called "respeakers" herein), communicate with the project network application 220 over the network 208.

In general, the worker systems 204 can include any type of computing device capable of executing one or more applications and/or accessing network resources. For example, the worker systems 204 can be desktops, laptops, netbooks, tablet computers, smartphones or PDAs (personal digital assistants), servers, or the like. The worker systems 204 include software and/or hardware for accessing the project network application 220, such as a browser or other client software.

As described above, the project network application 220 can provide, via a web site, one or more applications for performing respeaking. In the depicted embodiment, the project network application 220 includes a voice recognition engine 222 and a voice training module 224. As described above, the voice recognition engine 222 can convert language by workers into text. The project network application 220 can provide this text to the adaptive workflow system 210, which may pass the text to a broadcaster for inclusion in captions. In some embodiments where the captions are generated for non-live programs, the adaptive workflow system 210 can combine the captions with the non-live program and provide the modified program to a provider of the program.

The voice recognition engine 222 can perform the language-to-text conversion using various signal processing algorithms. Examples of voice recognition systems that can be used by the engine 222 include, among others, Dragon Naturally Speaking™ from Nuance™, ViaVoice™ from IBM™, and the CMU Sphinx Open Source Toolkit for Speech Recognition. In some embodiments, the voice recognition engine 222 uses multiple separate voice recognition systems, such as any subset of the examples listed above. Different voice recognition systems can be used to compare and contrast the accuracy of such systems. Further, some speakers may find that one system is more accurate than another or may have more experience with a certain system.

In one embodiment, the voice recognition engine 222 therefore provides options for workers 130 to use one or many voice recognition systems.

In some implementations, the voice recognition engine 222 is downloadable from the project network application 220 to the worker systems 204. The voice recognition engine 222 may be more accurate or faster at transcribing text when executed on the worker systems 204 than over the network 208. Some workers with faster network connections over the network 208 may be able to use the voice recognition engine 222 directly from the project network application 220 instead of downloading the engine 222.

The project network application 220 also includes a voice training module 224. The voice training module 224 can be used to initially train workers' respeaking skills. Workers can also use the voice training module 224 to refine their respeaking skills, for example, by retraining the voice recognition engine 222 subsequent to a respeaking project or by training the voice recognition engine 222 in preparation for a new respeaking project. Example training embodiments are described in greater detail below with respect to FIGS. 4 and 8.

The project network application 220 can include other features besides respeaking features. For instance, the project network application 220 can include web applications or the like that enable workers to initially register with the adaptive workflow system 210, receive initial training, track progress, receive reminders for upcoming broadcasts or other programs, and the like.

Both the project network application 220 and the adaptive workflow system 210 can execute on one or more computing devices, such as one or more physical server computers. In implementations where the project network application 220 or the adaptive workflow system 210 is implemented on multiple servers, these servers can be co-located or can be geographically separate (such as in separate data centers). In addition, the project network application 220 or the adaptive workflow system 210 can be implemented in one or more virtual machines that execute on a physical server. Further, the project network application 220 and/or the adaptive workflow system 210 can be hosted in a cloud computing environment, such as in the Amazon Web Services (AWS) Elastic Compute Cloud (EC2).

The adaptive workflow system 210 is depicted as including several components or modules. These components enable the adaptive workflow system 210 to perform a variety of functions. However, in various implementations, one or more of the components shown may be omitted from the adaptive workflow system 210 or other components may be included. Each of the components shown can be implemented in hardware and/or software. In addition, the adaptive workflow system 210 communicates with data repositories 240, 250 that include physical, non-transitory computer storage (e.g., magnetic, optical, volatile and/or nonvolatile semiconductor memory) for storing data related to operations of the adaptive workflow system 210, such as worker data and project data. For example, the worker data stored in the repository 240 can include voice files corresponding to each worker, which may include data used by the voice recognition engine 222 to recognize the voice of each worker. The project data stored in the repository 250 may include caption text, programs, and the like. Further, administrator systems 230 can communicate with the adaptive workflow system 210 to adjust operations of the adaptive workflow system 210 in ways that will also be described in detail below.

A project management module 212 of the adaptive workflow system 210 provides functionality for managing respeaking projects. The project management module 212 can output one or more user interfaces, provided for display to and accessible by the worker systems 204 and/or the administrator systems 230. These user interfaces can provide functionality for features such as project intake, project assignment to workers, quality control review, and the like.

For example, an administrator system 230, operated by an administrator of the provider of the adaptive workflow system 210 and/or an authorized customer operator, can access the project management module 212 to start new projects. An administrator can specify different attributes of a project, such as its name, due date, and the like. Further, the administrator can select workers to assign to the project or can select workers to whom the project will be made available. In general, workers can be assigned to projects and/or can be given the opportunity to select projects. Advantageously, in certain embodiments, the selection of workers to receive projects can be based, in whole or in part, on the users' performance ratings, so that higher rated workers are given preference for projects, thereby promoting project quality and reduced costs. As discussed elsewhere herein, other criteria may be used to select workers (e.g., time availability, location, time zone, customer specifications, etc.).

Performance ratings are calculated by the worker ratings calculator 214. The worker ratings calculator 214 may, but need not, use a multi-factored approach to adjust user ratings. These factors can include objective factors, such as whether a worker completed a project on time, subjective factors, such as the quality or accuracy of a worker's work, or both. In certain embodiments, the quality of the worker's work may be objectively determined, such as by an application or another worker that objectively analyzes the work. For example, a quality control worker may analyze the results of a worker's respeaking and determine how accurately or precisely the worker transformed the spoken word of a broadcast into text. The quality control worker may also assess the degree to which a mis-transcribed word is the fault of the voice recognition engine 222 rather than the respeaker.

Other examples of factors that the worker ratings calculator 214 can consider include thoroughness, professionalism, accuracy, a worker's availability, a worker's infrastructure (such as the quality of his computer system and/or network connection), a worker's rate (e.g., how much the user charges for the work), and the like. Yet another example of a performance factor can be a helpfulness factor, which can represent a degree to which a worker assists other workers. Information used in calculating a worker's performance may be accessed from the worker performance data repository 240. The project network application 220 may provide a social networking or collaborative functionality, which enables workers to post work-related questions, view work-related questions of other workers, and give answers. The system 210 may track, for a given worker, the number and/or type of such posted work-related questions, viewed work-related questions, and/or answered worked related questions. The helpfulness, and/or correctness of a worker's answers may be ranked by other workers (e.g., the worker that asked the question or other workers) and/or by an administrator. Workers that provide answers, particularly correct answers, may be given a higher helpfulness score than other workers that do not collaborate. Many other performance factors can be used in different embodiments. Examples of calculating worker performance ratings are described in greater detail below with respect to FIG. 6.

A failover module 215 is also provided in the adaptive workflow system 210. The failover module 215 can be used to maintain continuity in respeaking of a broadcast. In some broadcasts, such as broadcasts assigned a higher importance by a client, it can be desirable to have one or more backup respeakers. These backup respeakers can respeak while a primary respeaker is working. Should the primary respeaker fail to transmit text, or should the worker's system 204 fail, the failover module 215 can detect the failure and transfer control of the broadcast to one or more of the backup respeakers. In other embodiments, the backup respeakers do not actually respeak until a failure event is detected by the failover module 215. Example failover embodiments are described in greater detail below with respect to FIG. 5.

The adaptive workflow system 210 also includes a security module 216 in the depicted embodiment. The security module 216 can examine the worker systems 204 to confirm whether workers are sharing accounts with each other or with others. It can be desirable to prevent worker account sharing to reduce the risk of subcontracting (where a worker may improperly give a task assigned to the worker to another user to perform the task). When subcontracting occurs, the quality of projects can suffer as accountability is lost. For example, because the task is not being assigned based on the performance score of the person that is actually performing the task, the resulting quality may be less than expected. The security module 216 can identify users that log in from different locations simultaneously or substantially simultaneously (e.g., where a user logs-in in North America, and two hours later, logs-in in Asia or other location that it is impossible or unlikely for the authorized worker to have traveled to in a given amount of time), for instance, as a measure of identifying multiple workers sharing a single account. The security module 216 can also perform geo-filtering based on IP addresses to make this determination.

The adaptive workflow system 210 also includes a reporting module 218 that can provide a user interface for administrator systems 230 to access statistics about workers, to allocate projects to workers, and the like. The reports can include such information as project status, workers' throughput, worker performance ratings, worker completion percentage of a particular project, worker availability, historical information and trends for the foregoing, and the like. An example reporting user interface is described below with respect to FIG. 12.

A finance module 219 of the adaptive workflow system 210 can include functionality for administrators to maintain financial information about workers, such as their rates. The finance module 219 can include accounts payable functionality for paying workers based on the quantity work performed and/or the quality of the work, as well as accounts receivable functionality for billing tasks to clients of the adaptive workflow system 210 provider.

III. Example Respeaking Workflow Processes

Figure 3:
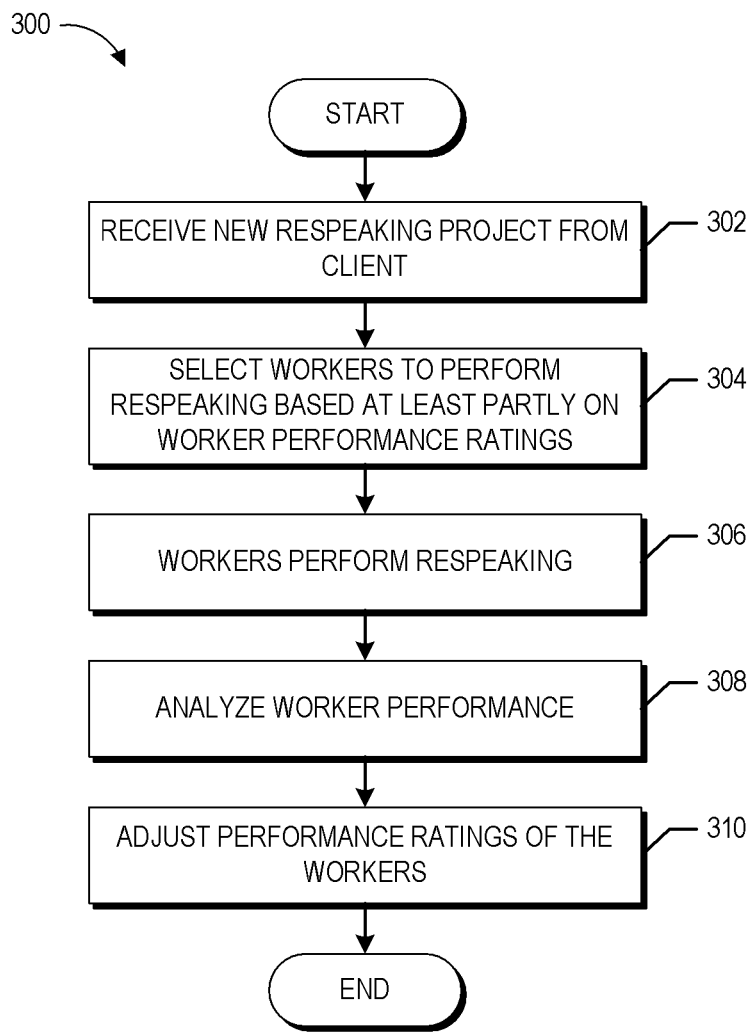
FIG. 3 illustrates an example embodiment of a captioning project management process.

FIG. 3 illustrates an embodiment of a project management process 300. The project management process 300 can be implemented by any of the systems described above. For illustrative purposes, the process 300 will be described as being implemented by components of the computing environment 200 of FIG. 2. The process 300 depicts an example overview of managing a distributed project, such as a respeaking project.

The process 300 begins at block 302, where the project management module 212 receives a new respeaking project from a client. This new respeaking project can be for a broadcast, an existing video, or the like, or a portion thereof. At block 304, the project management module 212 selects workers to perform the respeaking based at least partly on performance ratings of the workers. In one embodiment, the project management module 212 assigns workers to a project based on their rating. In addition or instead, the project management module 212 notifies workers (e.g., via email, SMS, MMS, a webpage, and application, or otherwise) that a project is available, due to their performance rating, and the workers may choose whether to accept the work via a corresponding user interface.

The project management module 212 can use any of a variety of models for selecting workers for a particular project based on performance ratings. As an example scenario, the project management module 212 could determine tiers of workers based on their performance ratings. Workers in a higher tier could be given more choice or higher paying work versus workers in a lower tier. For example, if the worker ratings calculator 216 calculates performance ratings on a 0-100 scale, 100 being the highest possible score, the project management module 212 can select workers with a rating of 75 or above for the highest paying or most interesting work. The project management module 212 might select workers having a rating in the range of 50-75 for lower level work, which may pay less, have fewer hours, or be less interesting. Further, the project management module 212 might assign workers with a rating lower than 50 to receive additional training or for other remedial action by management. The scoring scales and tiers used in this example, however, are mere examples that could be varied in different implementations.

The workers perform respeaking at block 306. Each worker assigned to the project may perform respeaking for the entire program (see FIG. 5). Alternatively, a plurality of workers may work on a program in shifts, for example, such that each worker respeaks for a portion of the program (such as in 10-15 minute increments). In another scenario, a single worker is assigned to each respeaking project. As many countries have laws mandating captions (such as closed captions) for some or all broadcasts, a distributed, large workforce can beneficially be used to handle many respeaking projects.

At block 308, the worker ratings calculator 214 analyzes the workers' performance at respeaking, and at block 310, performance ratings of the workers are adjusted to reflect this analysis. Performance rating calculations are described below in greater detail with respect to FIG. 6.

Figure 4:
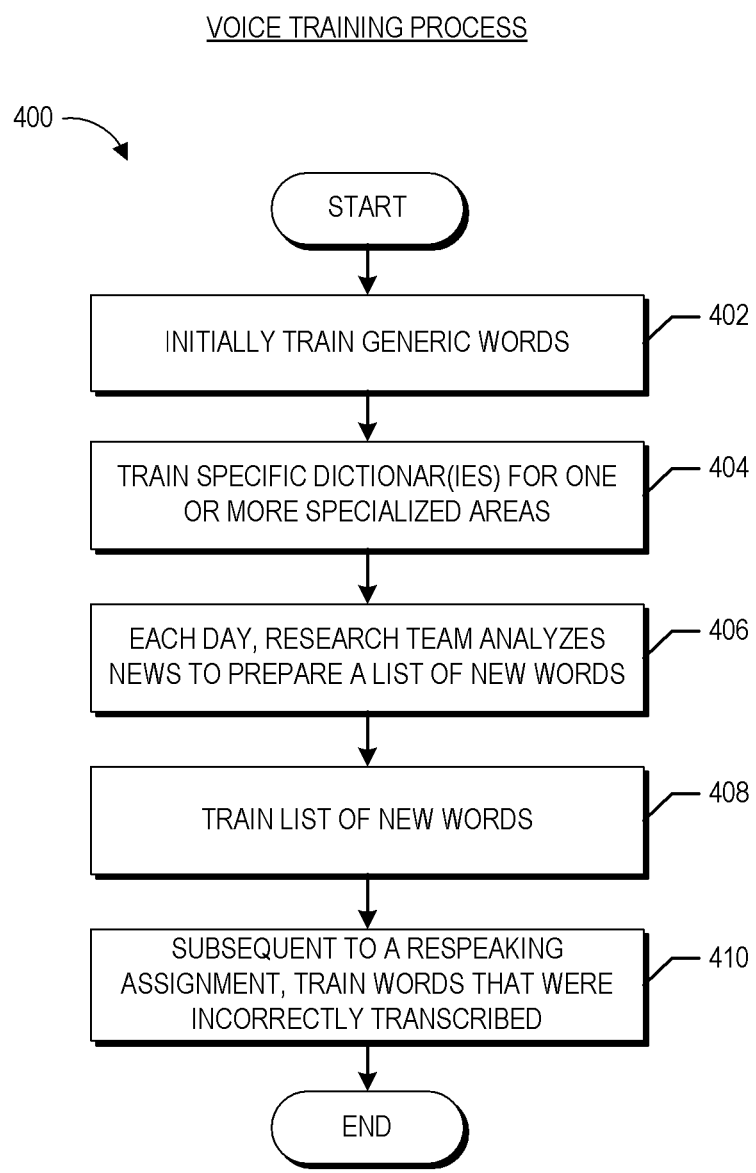
FIG. 4 illustrates an example embodiment of a voice training process.

FIG. 4 illustrates an example embodiment of a voice training process 400. The voice training process 400 can be implemented by any of the systems described above. For illustrative purposes, the process 400 will be described as being implemented by components of the computing environment 200 of FIG. 2. Advantageously, in certain embodiments, the process 400 enables respeakers to train voice recognition systems and thereby improve their performance. As will be described in greater detail below with respect to FIG. 6, respeaker training can be a factor in performance ratings, thereby motivating better respeaker performance.

Prior to becoming a respeaker authorized to perform work with the adaptive workflow system 210, applicants for respeaker positions can register with the project network application 220, fill out a questionnaire, and take a respeaking test. The test can be used to familiarize the applicants with the challenge of listening and respeaking, as well as for hiring evaluation purposes. The project network application 220 can automatically grade these tests based on comparing the results with a standard reference file. If applicants pass with a certain score, they can progress to an onboarding phase. In this phase, illustrated by block 402, respeakers can use the voice training module 224 to train generic words, for example, by reading a passage of words on a display. The respeakers can correct any words they get wrong. This initial training can result in the voice training module 224 creating an initial voice profile for the respeaker, which can be a document or set of data files that are stored in the worker data repository 240.

Once this initial training is completed, the respeakers can progress to a set training curriculum. In one embodiment, this training curriculum includes training specific dictionaries or sets of words for one or more specialized areas, as indicated in block 404. Each respeaker may be signed to a specific geographic area, topic of expertise, or both, based on the respeaker's background and area. Alternatively, respeakers need not specialize. However, specialization can facilitate better transcriptions of speech to text. For example, a respeaker may be assigned the news of Southern California. The voice training module 224 could supplement a respeaker's voice profile with the news of Southern California, any location-specific terms, and so forth. For example, the Southern California-specific dictionary could include terms specific to Los Angeles, such as the names of local politicians, sports teams, celebrities, local places, and so forth.

Each day (or other time period), as noted at block 406, a research team analyzes the news or other information sources to prepare a list of new words. The respeaker may use the voice training module 224 to train these new words at block 408. In one embodiment, the respeaker is responsible to train these new words each day before going on the air. In one embodiment, the research team, which may include one or more workers, may upload the list of new words each day or other period to the network application 220. The network application 220 can make these new words available for the respeaker to train upon the respeaker accessing the network application 220.

Further training may be performed subsequent to a respeaker assignment. For example, at block 410, a respeaker can use the voice training module 224 to train words that were incorrectly transcribed during a respeaker session. Performance of this training can also be taken into account in assessing the worker's performance. Workers that train before a program with new words and that train missed words after a program can become better respeakers, and this improvement can be reflected in their performance ratings and hence their benefits and enhanced opportunities for additional work, promotions, or the like.

In certain embodiments, the voice or speech profile of each respeaker is stored in the worker data repository 240 and is the property of the provider of the adaptive workflow system 210. The speech profiles may be encrypted to prevent theft. A respeaker therefore may not train on network application 220 and export his or her profile to another system, but would rather have to start over in certain embodiments. Retaining ownership over the respeakers' voice profiles can promote retention of respeakers and hence better quality respeaking service.

Figure 5:
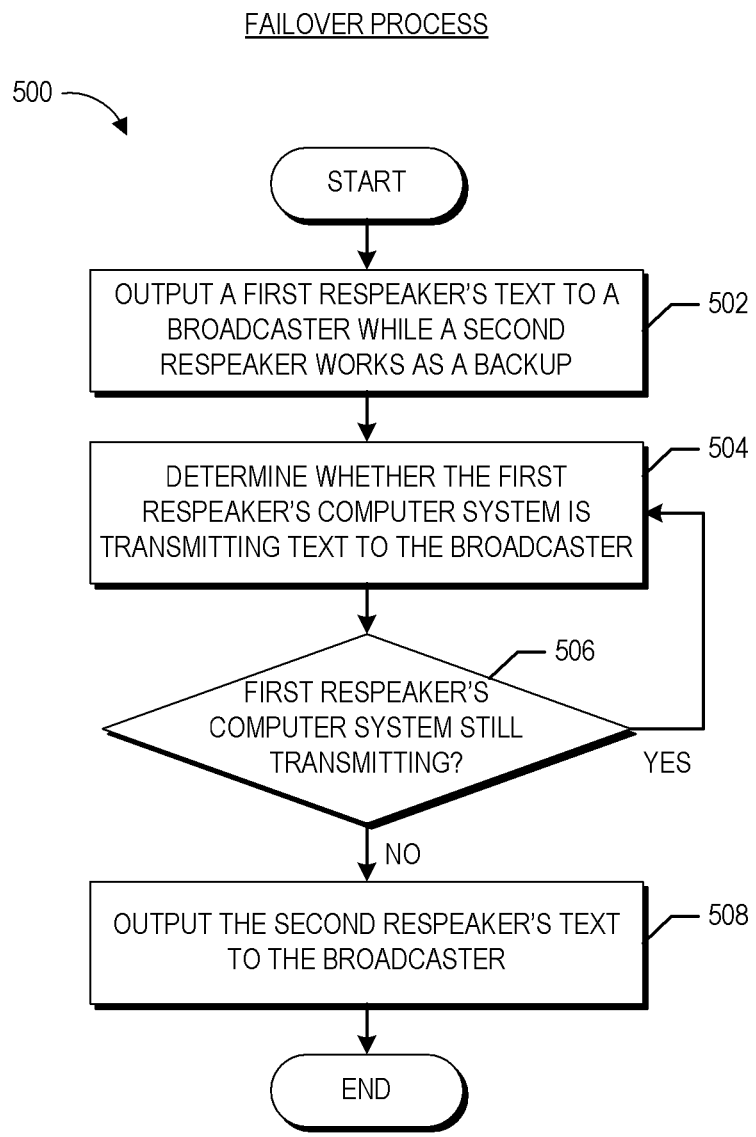
FIG. 5 illustrates an example embodiment of a failover process.

FIG. 5 illustrates an example embodiment of a failover process 500. The failover process 500 can be implemented by any of the systems described above. For illustrative purposes, the process 500 will be described as being implemented by components of the computing environment 200 of FIG. 2. Advantageously, in certain embodiments, the process 500 provides redundancy in the respeaking process, as well as potential training benefits.

The process 500 begins at block 502, where the project management module 212 outputs a first respeaker's text to a broadcaster while a second respeaker works as a backup respeaker. The second respeaker may be speaking in tandem with the first respeaker. In one embodiment, either the first or the second respeaker or both are not informed whether their text is actually being output in the broadcast. Thus, each respeaker may be fully engaged, which might not be the case if one of the respeakers knew that his text was not being output. As a result, using tandem respeakers can facilitate training for new respeakers who are not ready to broadcast live but may benefit from the experience of actually seeming to be doing a live broadcast.

In other embodiments, the second, backup respeaker does not respeak until a problem occurs with the first respeaker, his connection, or his computer system. In still other embodiments, more than two respeakers are used for a single program. Backup respeakers may be used for every broadcast or only for broadcasts that clients deem to be important.

At block 504, the failover module 215 determines whether the first respeaker's computer system is transmitting text to the broadcaster. If it is, as determined at block 506, the failover module 215 continues to monitor the first respeaker's output. Otherwise, if the first respeaker stops transmitting for whatever reason, the failover module 215 can transfer control to the second respeaker and output the second respeaker's text at block 508.

The failover module 215 can use any of a variety of techniques to determine whether the first respeaker's text is being transmitted properly. As one example, the failover module 215 can send a ping to the respeaker's computer system. If the failover module 215 receives a return message from the ping to the computer system, the failover module 215 can consider the computer system to be online and transmitting. If the ping does not return a message or does so slowly (e.g., due to high latency), any number of problems may have caused the poor or disabled connection, such as a problem with the computer system, a problem with the network, absence of the respeaker, or the like. The failover module 215 can then automatically transfer control to the second respeaker's system.

The failover module 215 may also, in some embodiments, monitor the actual transmission of text from the first respeaker's system to the personal network application 220. If no text is received after a certain period of time (and there has not been a pause in the broadcast), the failover module 215 can transfer control to the second respeaker's system. Third, fourth, or additional respeakers can be on hand for further redundancy.

Figure 6:
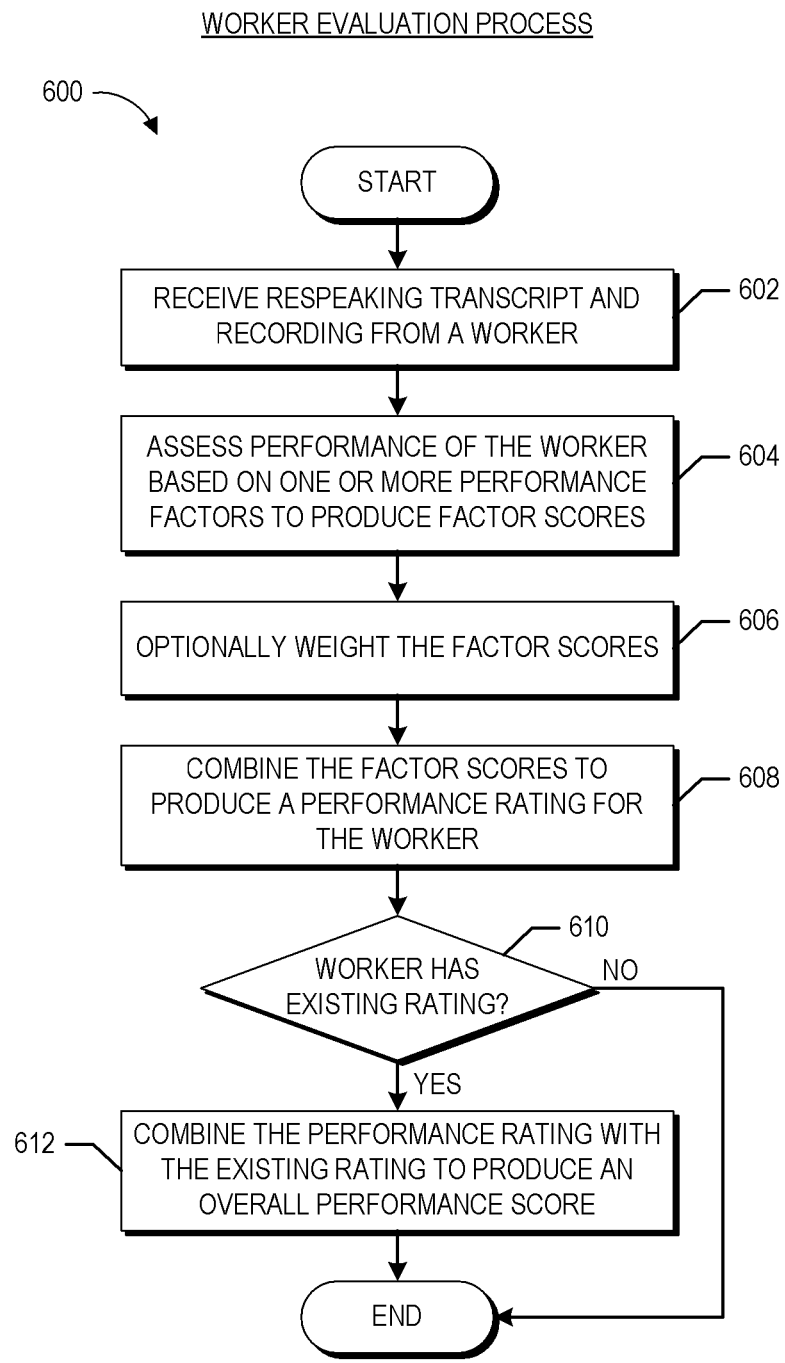
FIG. 6 illustrates an example embodiment of a worker evaluation process.

FIG. 6 illustrates an embodiment of a worker evaluation process 600. The worker evaluation process 600 can be implemented by any of the systems described above. For example, the process 600 will be described as being implemented, at least in part, by the adaptive workflow system 210 of FIG. 2. Specifically, aspects of the process 600 can be implemented by the project management module 212 and by the worker ratings calculator 214. The process 600 depicts an example embodiment for calculating worker performance ratings, which can advantageously be used to adjust the projects that are assigned or otherwise made available to workers.

The process 600 begins at block 602, where a respeaking transcript and recording of a program are received from a worker. A quality control worker may access the transcript and/or recording. At block 604, performance of the worker is assessed based on one or more performance factors to produce factor scores. In one embodiment, the quality control worker assigns scores to the performance factors based on an analysis of the transcript and the recording. In some embodiments, the worker ratings calculator 214 performs at least some of this analysis programmatically.

As described above, there are many potential factors that may be considered when evaluating workers. For instance, the timeliness, accuracy, availability, infrastructure, rate, training diligence, helpfulness, and professionalism of the worker/respeaker may be considered. In more detail, the timeliness of the worker can correspond to whether the worker met deadlines in performing respeaking work, whether the worker showed up to a broadcast on time, and the like. The accuracy of the worker can be evaluated objectively, subjectively, or both objectively and subjectively. Objective evidence of accuracy can be found by comparing the recording of a program with the transcript generated by the worker. However, a subjective component may also exist in determining accuracy because the worker may have enunciated a word correctly while the engine failed to properly transcribe a word. Thus, a quality control worker can take into account the clarity of a worker's enunciations as a subjective factor in evaluating accuracy in some embodiments when the voice recognition engine fails to properly transcribe a word.

Availability of a worker can correspond to the amount of time that the worker is available to perform respeaking projects. Workers with more availability can be more desirable, as they may require less supervision and may have more time and experience respeaking than others. The worker's infrastructure, including the worker's computer system and network connection, can play into the performance calculation as well. Workers with slower connections or older/less reliable systems may be more likely to drop out of a respeaking assignment and thus may be less preferred than other workers. Training diligence is another factor and can include determining whether the respeaker trains new words, whether the respeaker corrects words subsequent to a broadcast, and the like.

The quality control worker, administrator, and/or application can assign numerical scores to each performance factor or category, or a subset thereof. Alternatively, non-numerical scores can be assigned, such as qualitative scores (e.g., "high performer," "average performer," "low performer," etc.). As discussed above, some or all of the scoring may be performed by an application. For example, the worker ratings calculator may identify, via a time stamp, when a worker began respeaking or performed training, and determine and score the timeliness of the completion by comparing the time stamp to a specified required or desired-by date and/or based on an amount of time that elapsed between the user being given the work and the submission of the processed work. By way of further example, the application may measure how well the worker performed a task, as similarly discussed above, and score the performance.

The worker ratings calculator 214 optionally weights the factor scores at block 606. For instance, the worker ratings calculator 214 can provide a user interface that enables a quality control user or administrator to enter or adjust weights to be applied to the factors. Alternatively, the worker ratings calculator 214 applies internally stored weights to the factors, for example, by multiplying the factor scores by the weights. The weights to be applied to the performance factors can be driven by client desires, such as accuracy over infrastructure or vice versa. The weights can be percentages that are multiplied by the performance factor scores. For instance, if there are five factors, the weights can be percentages that sum to 100%.

The factor scores are combined by the worker ratings calculator 214 at block 608 to produce a performance rating for the worker. If the worker has an existing rating, as determined at block 610, the performance rating calculated at block 214 is combined with the existing rating by the worker ratings calculator 214 to produce an overall performance score at block 612. Otherwise, the process 600 ends.

A worker's existing rating can be updated in one embodiment by combining the existing rating with the new performance score for a particular project. Because users can improve or decline in performance, a window of time may be used in which existing performance data is considered. For instance, a worker's overall performance score can be based on the past four weeks of performance data or some other time period. Optionally, the worker's score, scoring history, and/or scoring trends may be provided to a worker system for display to the worker, so that the worker can monitor and be motivated to improve their score. Optionally, the worker's score, scoring history, and/or scoring trends may be provided to an administrator system for display to the administrator.

Figure 10:
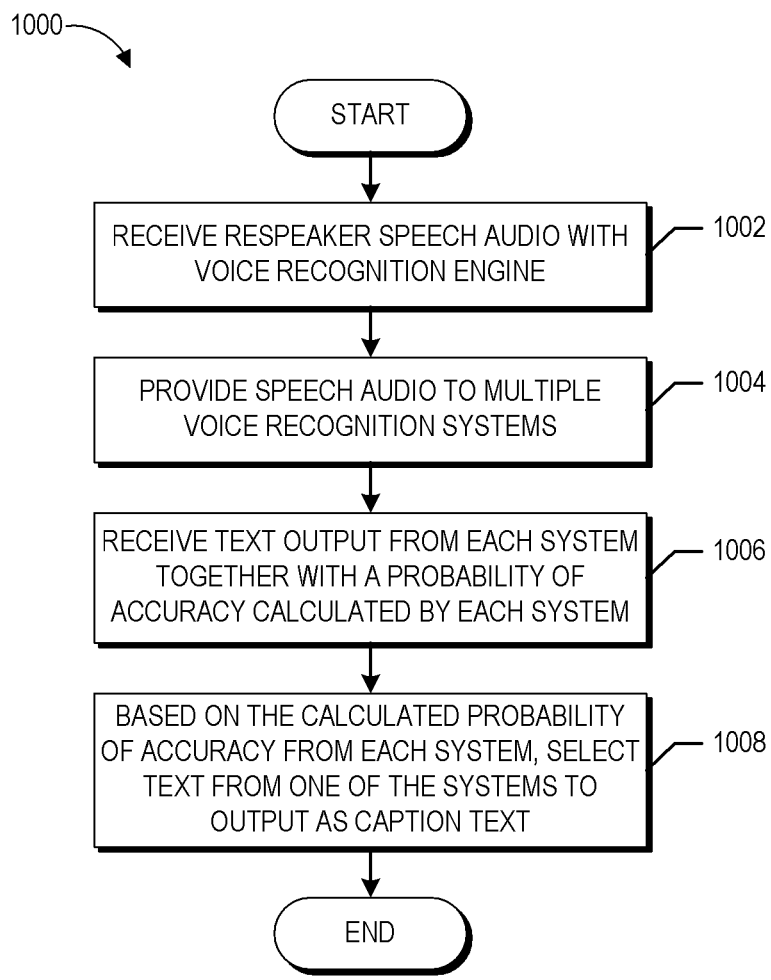
FIG. 10 illustrates an example embodiment of a parallel transcription process using multiple voice recognition systems.

FIG. 10 illustrates an example embodiment of a parallel transcription process 1000 using multiple voice recognition systems. The parallel transcription process 1000 can be implemented by any of the systems described above. For illustrative purposes, the process 1000 will be described as being implemented by components of the computing environment 200 of FIG. 2. In particular, the voice recognition engine 222 can implement aspects of the process 1000.

The process 1000 begins at block 1002, where the voice recognition engine 222 receives respeaker speech audio. At block 1004, the voice recognition engine 222 provides the speech audio to multiple voice recognition systems. Examples of these systems are described above, such as Dragon Naturally Speaking, ViaVoice, and Sphinx. The speech audio may be provided to two or more systems. Providing the speech audio to multiple voice recognition systems can enable a comparison of the output of each system to determine which system is most accurate. A real-time decision can be made as to which system output should be provided as caption text for a program.

The voice recognition engine 222 receives the text output from each system at block 1006. In addition, the voice recognition engine 222 receives a calculated probability of accuracy calculated by each system, corresponding to the text output. This text output and corresponding accuracy score may be received a single word at a time, phrase at a time, or both. Each system may be natively configured to output such a calculation. In one embodiment, the voice recognition engine 222 accesses this calculated accuracy information by making one or more API calls to the systems.

At block 1008, the voice recognition engine 222 selects text from one of the systems to output as the caption text based on the calculated probability of accuracy from each system. The voice recognition engine 222 can select the text having the highest estimated accuracy. The voice recognition engine 222 may also use other criteria to select text from a particular voice system. For instance, the voice recognition engine 222 can choose the output from a system based on the time used by that system to release grammar corrected text. Voice recognition systems often have internal grammar checkers to help verify the correct words, and some may take longer depending on the phrase. Thus, if one system outputs text more quickly than another, the voice recognition engine 222 can select this text for output as a caption over the other systems' output. The voice recognition engine 222 can combine this speed-based selection with the accuracy-based selection, using both as factors, or may use one or the other factor alone.

IV. Example User Interfaces

Figure 7:
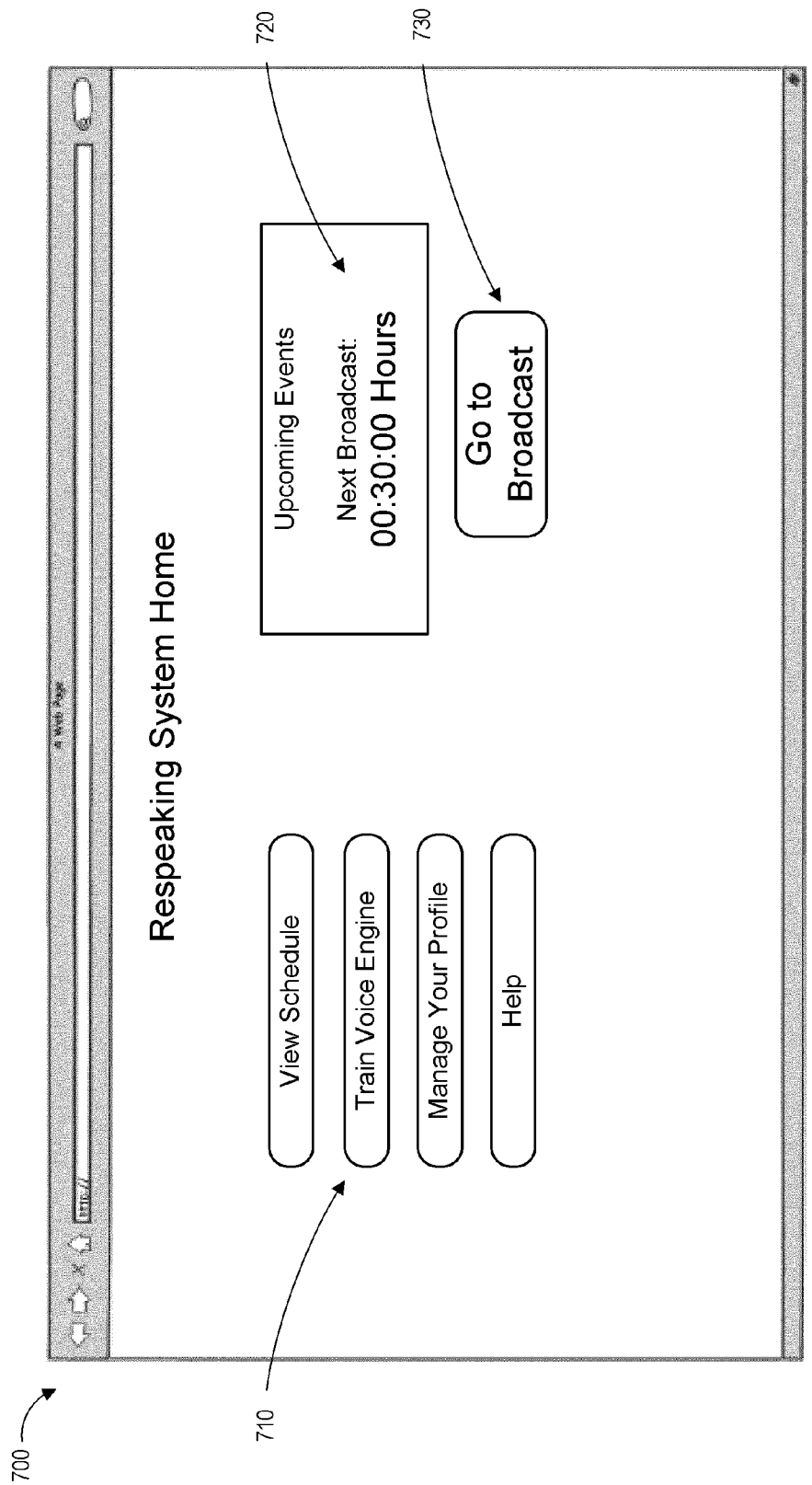
FIGS. 7-9 illustrate example embodiments of user interfaces that can be used to implement captioning projects.
Figure 8:
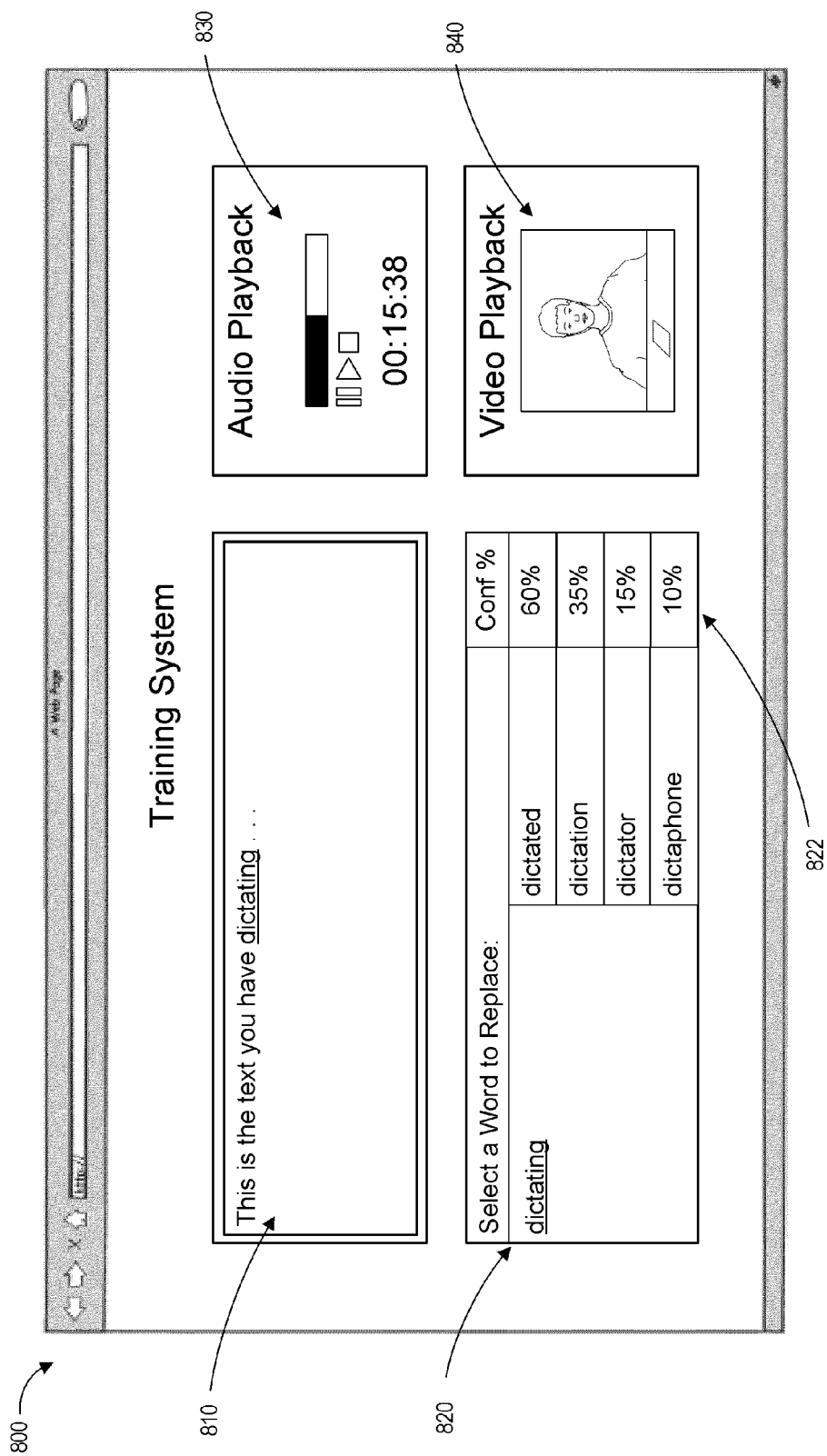
Figure 9:
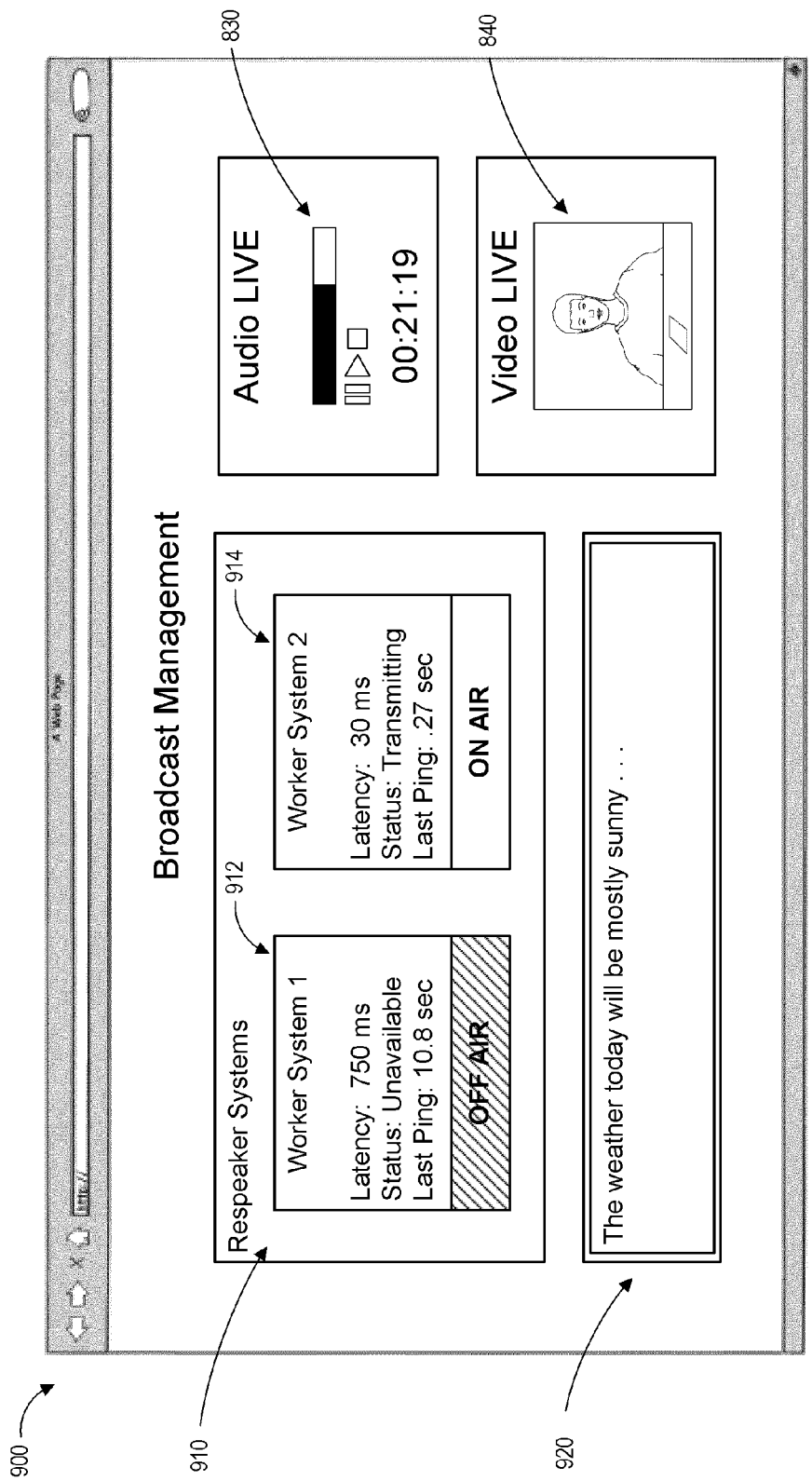

FIGS. 7-9 illustrate embodiments of user interfaces 600-1200 that can be used to implement respeaking projects. Certain of these user interfaces can be output by the project network application 220, while others are output by the project management module 212. The user interfaces can be accessed with browser software or other client software.

Referring specifically to FIG. 7, an example of a respeaker home user interface 700 is shown. This user interface 700 can be accessed by a respeaker via the project network application 220. The user interface 700 includes a menu 710 that allows a user to select a variety of tasks, such as viewing his respeaking schedule, training the voice engine, managing his profile (e.g., updating contact information, vacation schedule, accessing payments, etc.), and accessing help information. Further, the user interface 700 includes a status display 720 that reminds the respeaker of the next upcoming broadcast or program. A "go to broadcast" button 730 enables the user to begin respeaking for a particular broadcast. Many other options or fewer options may be provided on a similar user interface in other implementations.

FIG. 8 illustrates an example training user interface 800 that may also be accessed by respeakers via the project network application 220. For instance, the voice training module 224 may output the user interface 800 shown or a similar user interface. The training user interface 800 includes audio and video playback controls 830, 840 for reviewing a program. A text box 810 includes text that was transcribed when the user respoke the program. A training box 820 includes optional words that can be used to replace or correct words or phrases shown in the text box 810, together with optional confidence values 822 that the voice recognition engine 222 may have output for these secondary words. The training box 820 may be optional in some embodiments. For instance, instead of a training box 820, the respeaker may simply vocalize a word that was stated incorrectly into the voice recognition engine 222 and then correct the output of the voice recognition engine 222 (e.g., by typing in the correct word in a user interface provided by the voice recognition engine).

FIG. 9 illustrates an example management user interface 900 that enables a user, such as an administrator, to manage broadcasts. In the example user interface 900 shown, status data 910 on respeaker systems is shown. This status data includes first data 912 for a first respeaker system and second data 914 for a second respeaker system. This status data includes information such as latency, whether the system is transmitting ("status"), the last ping time, and whether the system is on or off the air. A text box 920 displays the text that is being output by the voice recognition engine 222 in response to a worker's respeaking. As shown in the depicted embodiment, the first data 912 for the first respeaker system indicates that this respeaker is off the air because the respeaker is unavailable. The second data 914 indicates that a second, possibly backup respeaker is now on the air.

Further, although not shown, one or more user interfaces can also be provided for a client or customer to access the adaptive workflow system 210 and/or project network application 220. These user interfaces can include an intake user interface that enables a client to specify parameters of a project, such as its due date, the client's preference on notifications (such as how often to be updated on the status of the project), payment information or a purchase order, and the like. Another user interface that can be provided by the adaptive workflow system 210 can be a review user interface, where a client reviews respeaking transcripts. The user interface may also provide functionality for the client to select preferred respeakers over others.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of performing distributed caption generation, the method comprising:
   programmatically selecting first and second respeakers to perform respeaking with a voice recognition engine for a broadcast program based at least in part on past performance ratings of the first and second respeakers;
   receiving first text generated by the first respeaker for inclusion in the broadcast program;
   receiving second text generated by the second respeaker for inclusion in the broadcast program, wherein the second text is being received as backup in case receipt of the first text is interrupted;
   electronically outputting the first text for inclusion as captions in the broadcast program;
   determining whether receipt of the first text is interrupted;
   in response to determining that receipt of the first text is interrupted, outputting the second text for inclusion in the broadcast program; and
   programmatically calculating new performance ratings for the first and second respeakers, the new performance ratings configured to be used to assign the first or second respeaker to a subsequent broadcast program, said calculating the new performance ratings for the first and second respeakers comprising taking into account at least the following factors:
   network connections of the first and second respeakers;
   whether the first and second respeakers train the voice recognition engine, subsequent to the broadcast program, with words incorrectly transcribed during the broadcast program; and
   whether the first and second respeakers train the voice recognition engine with new words not previously recognized by the voice recognition engine;
   wherein the new performance ratings are negatively impacted if the first and second respeakers fail to train the voice recognition engine and are positively impacted if the first and second respeakers train the voice recognition engine; and
   wherein at least said determining and said calculating are implemented by a computer system comprising computer hardware.

2. The method of claim 1, wherein said determining that receipt of the first text is interrupted comprises pinging a computer system operated by the first respeaker.

3. The method of claim 2, wherein a timeout in said pinging results in the determination that the first text is interrupted.

4. The method of claim 1, wherein said calculating the new performance ratings further comprises evaluating one or more of the following performance factors: accuracy, timeliness, availability, rate, and professionalism.

5. The method of claim 1, wherein said broadcast program is broadcast over the air, via cable, via satellite, and/or via a computer network.

6. The method of claim 1, wherein said past performance ratings are based in part on an accuracy rating with respect to voice recognition performed by a voice recognition system for the first respeaker and the second respeaker.

7. A method of performing distributed caption generation, the method comprising:
   selecting a respeaker to perform respeaking with a voice recognition engine for a broadcast program based at least in part on a past performance rating of the respeaker;
   receiving text generated by the respeaker for inclusion in the broadcast program;
   electronically outputting the text for inclusion in the broadcast program;
   calculating a new performance rating for the respeaker, the new performance rating configured to be used to evaluate whether to assign the respeaker to a subsequent broadcast program, said calculating the new performance rating comprising taking into account at least the following factors:
   a network connection of the respeaker;
   whether the respeaker trains the voice recognition engine, subsequent to the broadcast program, with words incorrectly transcribed during the broadcast program;
   whether the respeaker trains the voice recognition engine with new words not previously recognized by the voice recognition engine; and
   wherein the new performance rating is negatively impacted if the respeaker fails to train the voice recognition engine and is positively impacted if the respeaker trains the voice recognition engine; and
   wherein at least said calculating is implemented by a computer system comprising computer hardware.

8. The method of claim 7, wherein said calculating the new performance ratings further comprises evaluating one or more of the following performance factors: accuracy, timeliness, availability, rate, and professionalism.

9. The method of claim 7, wherein said calculating the new performance rating further comprises evaluating whether a computing system of the respeaker reliably transmits the text during the broadcast program.

10. A system for performing distributed caption generation, the system comprising:
    a project management module configured to select a respeaker to perform respeaking with a voice recognition engine for a broadcast based at least in part on a past performance rating of the respeaker;
    a project network application comprising a respeaking module configured to:
    provide functionality for the respeaker to generate text responsive to audio from a broadcast,
    receive text generated by the respeaker, and
    electronically output the text for inclusion in the broadcast; and a worker ratings calculator comprising computer hardware, the worker ratings calculator configured to calculate a new performance rating for the respeaker, the new performance rating configured to be used to evaluate whether to assign the respeaker to a subsequent broadcast program, wherein the worker rating calculator is further configured to calculate the new performance rating by taking into account at least the following factors:
a network connection of the respeaker;
whether the respeaker trains the voice recognition engine, subsequent to the broadcast program, with words incorrectly transcribed during the broadcast program; and
whether the respeaker trains the voice recognition engine with new words not previously recognized by the voice recognition engine;
wherein the new performance rating is negatively impacted if the respeaker fails to train the voice recognition engine and is positively impacted if the respeaker trains the voice recognition engine.

11. The system of claim 10, wherein the worker ratings calculator is further configured to calculate the new performance ratings by at least evaluating one or more of the following performance factors: accuracy, timeliness, availability, rate, and professionalism.

12. Non-transitory physical computer storage comprising instructions stored thereon for implementing, in one or more processors, operations for performing distributed caption generation, the operations comprising:
selecting a respeaker to perform respeaking with a voice recognition engine for a first program based at least in part on a past performance rating of the respeaker;
receiving text generated by the respeaker for inclusion in the first program;
electronically outputting the text for inclusion in the first program; and
programmatically calculating a new performance rating for the respeaker, the new performance rating configured to be used to evaluate whether to assign the respeaker to a subsequent program, wherein said calculating the new performance rating comprises taking into account at least the following factors:
a network connection of the respeaker;
whether the respeaker trains the voice recognition engine, subsequent to the first program, with words incorrectly transcribed during the broadcast program; and
whether the respeaker trains the voice recognition engine with new words not previously recognized by the voice recognition engine;
wherein the new performance rating is negatively impacted if the respeaker fails to train the voice recognition engine and is positively impacted if the respeaker trains the voice recognition engine.

13. The non-transitory physical computer storage of claim 12, wherein said calculating the new performance ratings comprises evaluating one or more of the following performance factors: accuracy, timeliness, availability, rate, and professionalism.

14. The non-transitory physical computer storage of claim 12, wherein the first program comprises a live broadcast.

15. The non-transitory physical computer storage of claim 12, wherein the first program comprises a video.

16. The non-transitory physical computer storage of claim 12, wherein said outputting the text comprises supplying the text as subtitles for the first program.

17. The non-transitory physical computer storage of claim 12, wherein said outputting the text comprises supplying the text as captions for the first program.

18. The non-transitory physical computer storage of claim 12, in combination with a computer system comprising computer hardware.

* * * * *